No. 713,376. Patented Nov. 11, 1902.
I. F. BAER.
COAT HANGER.
(Application filed Apr. 5, 1902.)
(No Model.)
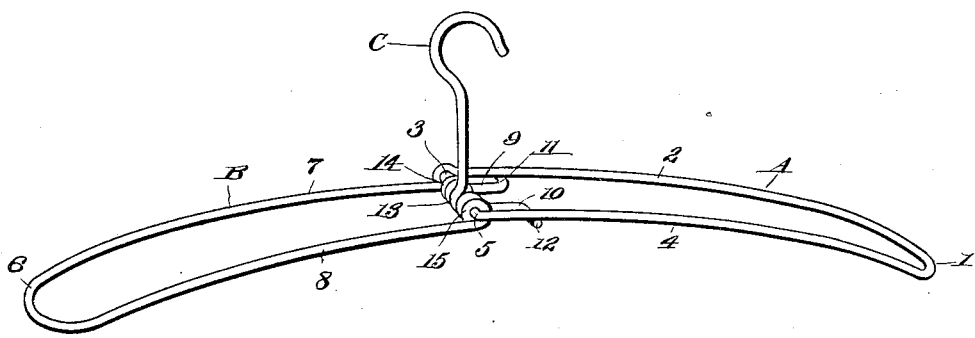
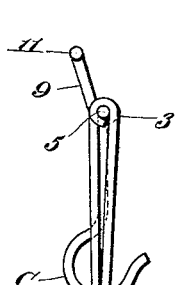
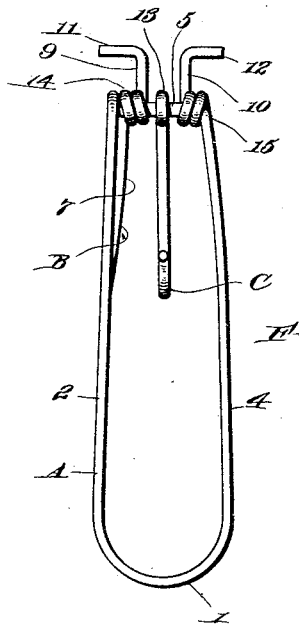
Witnesses:
Oscar F. Hill
Arthur D. Randall
Inventor:
Ivan F. Baer
by Wm. A. Copeland
atty

UNITED STATES PATENT OFFICE.

IVAN F. BAER, OF MONSON, MASSACHUSETTS, ASSIGNOR TO CARLOW & PUTNAM COMPANY, OF WORCESTER, MASSACHUSETTS, A CORPORATION OF MASSACHUSETTS.

COAT-HANGER.

SPECIFICATION forming part of Letters Patent No. 713,376, dated November 11, 1902.

Application filed April 5, 1902. Serial No. 101,570. (No model.)

*To all whom it may concern:*

Be it known that I, IVAN F. BAER, a citizen of the United States, and a resident of Monson, in the county of Hampden and State of Massachusetts, have invented certain new and useful Improvements in Coat-Hangers, of which the following is a specification.

The object of my invention is to produce a coat-hanger comprising two arms and a hook, all of which are hinged together and fold compactly when desired.

The invention will now be fully described, and particularly pointed out in the claims at the end of the specification.

In the drawings, Figure 1 represents a coat-hanger embodying my invention when spread open. Fig. 2 is a side elevation of the same when folded. Fig. 3 is a plan of the same when folded.

The present method of construction of my coat-hanger is to form each arm and the hook of a separate piece of wire, the wires which form the arms being doubled, the ends of the wire which compose one arm forming the pivot of the hinge, the wire which composes the other arm being coiled near its ends to form eyes which hinge on said pivot, the extension of said wire beyond the eyes being bent to form rests which prevent the arms from folding downward, but leaving them free to fold upward, and the wire which composes the hook having at the ends of its shank an eye by which the hook is hinged on said pivot and swings between the two branches of each arm.

Referring now to the drawings, the arm A is formed of a wire which is bent near the middle, thus forming the outer end 1 of the arm, the branch 2 being coiled at its end to form an eye 3, and the branch 4 being bent across and passing through the eye 3, so as to form the pivot 5 for the other arm and the hook. The arm B is formed of a wire which is also bent at the middle, forming the outer end 6 of the arm. Both branches 7 and 8 are coiled around the pivot 5, forming the knuckles 14 15 of the hinge, thence having extensions 9 10 beyond the pivot, which are then bent outwardly under the branches 2 4 of the arm A and form rests 11 12 for the arm A and prevent it from turning downward on the hinge below the position shown in Fig. 1.

The hook C is formed of a third wire, which is formed with an eye 13, coiled around the pivot 5, between the eyes of the arm B, and being free to turn on said pivot.

When in use, the coat-hanger is in the form shown in Fig. 1 and is suspended by the hook C. The weight of the garment will always keep the arm A firmly down on the rests 11 12, and thus the hanger is kept spread. When the garment is removed, the arms will fold back onto each other, and the hook C may also be folded over out of the way between the branches, so as to be in the compact form shown in Figs. 2 and 3.

What I claim is—

1. A folding wire coat-hanger comprising two arms and a suspension-hook all hinged together so as to fold upwardly, each arm being formed of a wire bent double, the wire which forms one arm having the inner end of one of its branches extended laterally and forming a pintle on which the other arm and the suspension-hook are hinged, one of the arms having projections which extend under the other arm and form rests which at all times prevent the arms from folding together downwardly, and all the members being free to be folded together upwardly, substantially as described.

2. A folding wire coat-hanger comprising two arms and a suspension-hook, each of said three members being formed of a separate wire, one arm being formed of a wire bent double and having the inner end of one branch bent crosswise to the other branch and forming a pivot for the other two members, the second arm being formed of a wire bent double, both branches of which are coiled about the said pivot so as to turn thereon and terminate in extensions which project beneath the two branches of the first arm and form rests which prevent the two arms from folding downward, the suspension-hook being formed of a third wire whose shank is coiled about said pivot between the branches of the two arms and is free to turn on said pivot, substantially as described.

In testimony whereof I have affixed my signature in presence of two witnesses.

IVAN F. BAER.

Witnesses:
CARLOS M. GAGE,
HARRY L. BARTLETT.